United States Patent [19]
Schulze et al.

[11] Patent Number: 5,355,705
[45] Date of Patent: Oct. 18, 1994

[54] PROCESS FOR CONTROLLING THE REVOLVING PATH MOTIONS OF THE SPINNING ROLLER OF A SPINNING LATHE, AND SPINNING LATHE FOR PERFORMING THE PROCESS

[76] Inventors: Eckehart Schulze, Stahlbühlstrasse 36, 7251 Weissach-Flacht; Hans Hartmann, Emser Strasse 14, 7000 Stuttgart 50, both of Fed. Rep. of Germany

[21] Appl. No.: 945,980
[22] PCT Filed: May 4, 1991
[86] PCT No.: PCT/EP91/00847
§ 371 Date: Jan. 4, 1993
§ 102(e) Date: Jan. 4, 1993
[87] PCT Pub. No.: WO91/17004
PCT Pub. Date: Nov. 14, 1991

[30] Foreign Application Priority Data
May 4, 1990 [DE] Fed. Rep. of Germany ....... 4014405

[51] Int. Cl.$^5$ .............................................. B21D 22/16
[52] U.S. Cl. ............................................. 72/83; 72/81
[58] Field of Search ..................................... 72/81, 83

[56] References Cited
U.S. PATENT DOCUMENTS

| | | | |
|---|---|---|---|
| 3,496,747 | 2/1970 | Delmer et al. | 72/81 |
| 4,565,081 | 1/1986 | Massee | 72/83 |
| 4,976,126 | 12/1990 | Yamamoto et al. | 72/83 |

*Primary Examiner*—Lowell A. Larson
*Attorney, Agent, or Firm*—Antonelli, Terry, Stout & Kraus

[57] ABSTRACT

A process is disclosed for controlling the revolutions of the spinning roller (29) of a spinning lathe (10). The coordinate driving units (52,53), which are designed as valve controlled (49,51) hydrocylinders (42,47), are operated according to a playback process according to which the coordinate driving units (52,53) are operated according to a follow-up process in which position set values are electrically preregulated and mechanical real values are fed back. The slowing down path $\Delta S$ (lag error) is continuously measured at least during the last revolution of the spinning roller (29), so that when a threshold value $\Delta S_{max}$ is exceeded, the tracking speed $V_B$ is reduced and/or a transitioning to an intermediate routing curve occurs. A spinning lathe for carrying out the process is also disclosed.

10 Claims, 4 Drawing Sheets

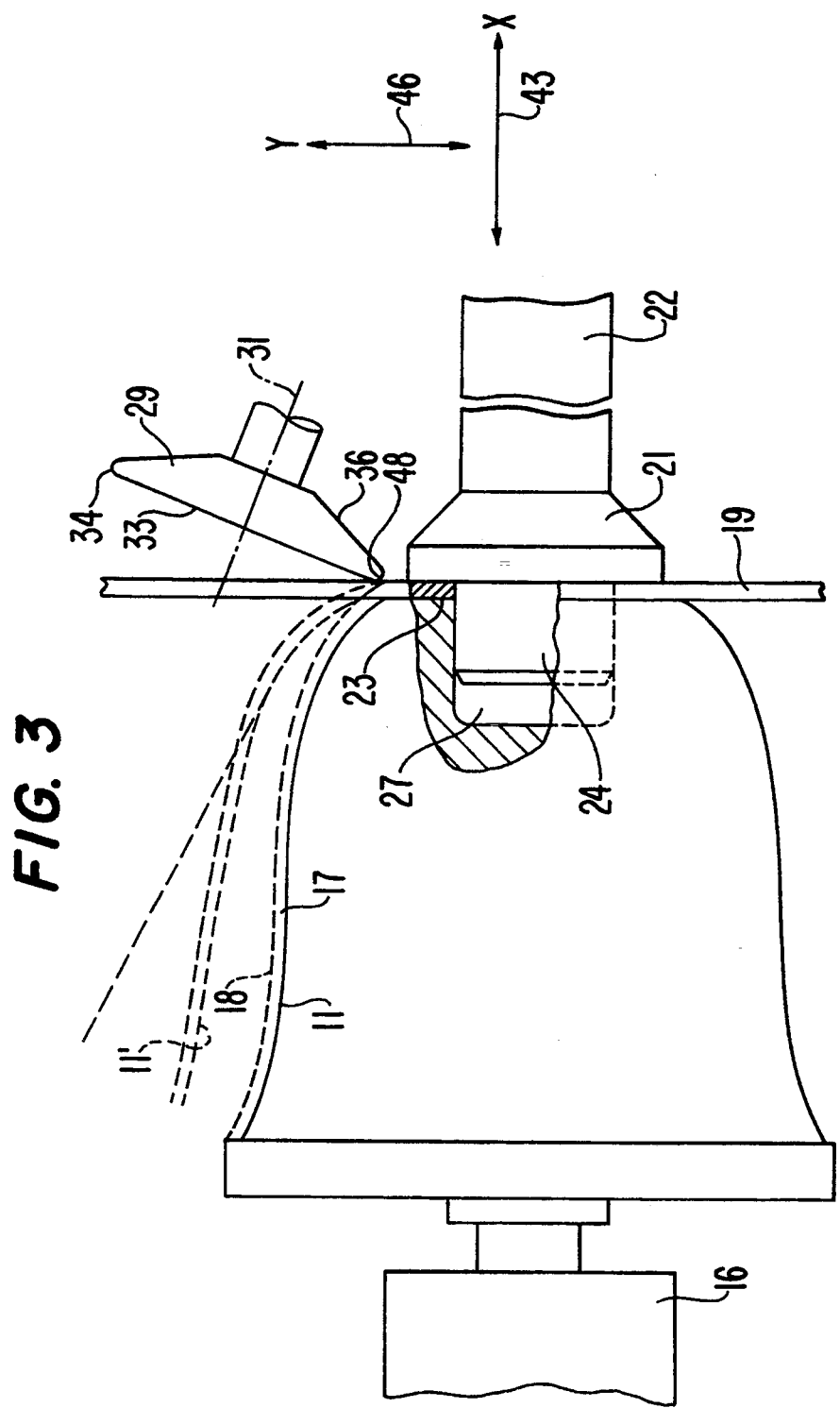

PROCESS FOR CONTROLLING THE REVOLVING PATH MOTIONS OF THE SPINNING ROLLER OF A SPINNING LATHE, AND SPINNING LATHE FOR PERFORMING THE PROCESS

FIELD OF THE INVENTION

The invention relates to a process for controlling the revolving path motions of the spinning roller of a spinning lathe as set forth herein as well as to a spinning lathe suitable for performing the process.

BACKGROUND AND SUMMARY OF INVENTION

A process of the type mentioned in the foregoing can be derived from EP-A-0062685. The conventional process is a path-duplicating (playback) method, according to which, in at least one, usually several, master spinning process or processes executed by an expert in the spinning art, coordinate data characteristic for the thus-traversed positions of the spinning roller determined with the aid of position pickups are stored in an electronic NC or CNC control unit and processed by the latter to output data; by serial call-up of these data, X- and Y-coordinate drive units of the spinning machine can be actuated along the lines of tracing the route of the spinning roller determined in the master spinning process. First of all, the contour of the spinning chuck is scanned and a set of coordinate data characteristic for its contour is fed into the NC or CNC control unit; from these data, a safety curve is determined, for example by interpolation, marking the limit of closest-possible approach of the spinning roller toward the spinning chuck. In the conventional process, the contour of the spinning roller proper is utilized as the safety curve.

In accordance with the conventional process of EP-A-0062685, the stored data include, in addition to the coordinate data, also data characteristic for the operating pressures linked to the respective coordinates; these latter data are utilized in the spinning processes subsequently repeated with great frequency for feeding corresponding pressures into the coordinate drive units—hydraulic cylinders. This is done to avoid drawbacks inherent in known path repetition processes used merely with storage of the path coordinates with exploitation of the latter as the desired data for the path motion control of the spinning roller; such drawbacks are seen in that even minor deviations of the shape of the round blank to be subjected to the spinning machining step from a reference shape can lead to the result that an exact tracing of the stored revolution routes is impossible and thereby spun parts of a very differing quality can be produced. Accordingly, the conventional process operates with a three-dimensional set of route tracing data which itself is accompanied by considerable technical expenditure and—on account of the processing time required—causes additional time requirement for the spinning procedure.

The conventional process furthermore has the disadvantage that considerable errors can occur in the detection of the operating pressures of the coordinate drive cylinders during the master spinning process, as well as in their introduction into the control during the spinning processes performed for manufacturing a relatively large series of maximally identical spun parts; this can manifest itself in clearly recognizable quality differences in the surface characteristic of the thus-produced spun parts. It is true that "scattering" of the quality of the manufactured spun parts due to inaccuracies in pressure detection and metered application during the "learning" of the routes as well as during their control can be kept to a moderately low level by taking care when performing the master spinning process that the operating pressures in total are maintained at a constant value along the lines that the forces acting on the sheet-metal workpiece are kept extensively constant over the various revolutions; however, this poses considerable demands for the spinning expert entrusted with performing the master spinning process since this person, while steering the master spinning process "by hand", must not only monitor the workpiece and the spinning roller but also the pressure indications for the coordinate drive cylinders, which is difficult and taxing and normally requires that a master spinning process must be repeatedly performed until finally an optimum set of coordinate and pressure data has been determined. A master spinning process making it possible to use the conventional process with the result of a properly uniform quality of the spun parts thus is very time-consuming and can be conducted at all only by using a highly qualified and very experienced spinning expert.

Additional programming and control expenditure also arises when operating according to the conventional process when using a customary scanning head for scanning the outer contour of the spinning chuck as the safety curve, this scanning head comprising a scanning ball of a small diameter that can be deflected into two mutually perpendicular directions; this scanning ball—after defined deflection strokes—opens alternatively respectively one of two switches whereby the attainment of a certain position is being announced. In this case, especially with small thicknesses of the material of the finished spun part, even very minor inaccuracies in the path control of the spinning roller, the radius of curvature of which in the rolling generating point can be markedly different from the radius of curvature of the scanning ball, will be enough for causing undesirably high relative deviations from the desired thickness of the spun part.

Therefore, it is an object of the invention to improve a process of the type discussed hereinabove so that performance of the master spinning process is simplified and also conductance of the spinning steps required for manufacturing spun parts can be controlled with simpler technical means.

This object has been attained with regard to the process of the invention by the features described and claimed herein as well as by the features of the spinning lathe of the invention which is suitable for performing the process.

A path control of the spinning roller in this process and spinning lathe of the invention is obtained in a simple way by the accordingly provided type of operating control of the coordinate drive units in accordance with a follow-up control process working with electrically controlled reference position value presetting and mechanical actual position value acknowledgment. This control process permits monitoring of the follow-up route—the so-called lag error—of the coordinate drive units and monitoring of the follow-up route. The increase of this follow-up route past a threshold value $\Delta S_{max}$ is an indication of the fact that the forces necessary for forming the workpiece material are growing larger than beneficial for a "smooth" shaping of the material. Also providing advantageous path control are the measures, triggered when this threshold value of this follow-up route has been exceeded, of lowering the path-tracing speed of the spinning roller and/or the transition to a routing curve of the spinning roller corresponding to an enlargement of the distance of the spinning roller rolling-off point, measured normally to the outer contour of the spinning chuck, with respect to its previously governing desired value curve, until once more a value for the follow-up path has been reached which is compatible with a good quality of the spun part to be produced. This path control, even if in the master spinning process only an approximately optimum route has been determined, leads to a gentle machining of the workpiece and therefore in the final result also to a good quality of its surface characteristic which can be attained with good reproducibility. The "learning procedure" can thus be executed with a substantially lower time consumption.

By utilizing the spinning roller as a "scanning head", it is ensured in a simple way that, with utilization of the positional coordinates, linked to its contact with the scanning supporting points, as the "safety curve", any possibly flawed conversion calculations are avoided, i.e. the danger is reliably excluded that, with very thin thicknesses of the material of a spun part to be produced, the safety curve could be "exceeded" with the consequence of damage to the spinning chuck.

In combination therewith, it is also possible, thanks to the type of operating control of the coordinate drive units provided—in accordance with this invention—to utilize the drive cylinders of these units also for scanning the outer contour of the spinning chuck, as specified in greater detail below.

A procedure of the invention utilizes the path routing coordinates of one revolution of the spinning roller as the reference path coordinates for a subsequent spinning process as set forth herein. This procedure permits an optimum route of the path of motion of the spinning roller in a few steps of path correction. In combination with an automatic control of this version of the process, a "self-programming" of the electronic control unit is readily possible, leading to an optimum track for the spinning roller in preliminary spinning steps as well as in a final spinning procedure.

It is then also possible, as provided in more detail hereinafter, to determine the desired course of a contour of the spun part along which the spinning roller moves solely by its numerical presetting.

A safety measure which ensures optimum protection of the spinning chuck is also provided according to the invention by adding coordinate increments to the scanning coordinate data to produce a set of coordinate data corresponding to a safety contour in a manner described more fully herein.

Additional features of the invention described hereinafter indicate a kind of scanning of the outer contour of the spinning chuck by means of the coordinate drive unit which also yields data on the evolution of the follow-up path along the route-tracing curves; these data can be evaluated in a simple way so that it is possible to maintain, during the spinning process, a constant or almost constant amount of the follow-up path which, in turn, provides the possibility in a simple way of controlling the motion control of the spinning roller in dependence on essentially one value of a maximum follow-up path $\Delta S_{max}$.

Corresponding remarks apply analogously to a further procedure of the invention which is provided as an alternative to the aforementioned steps, namely to detect the follow-up path and to evaluate same with a view toward controlling the route with a substantially constant follow-up path.

In the embodiment of a spinning lathe provided according to the invention as set forth herein, the spinning lathe is suitable for performing the process of this invention and, monitoring of limit values of the follow-up path can take place in a simple way, for example with the aid of limit switches responding starting with a minimum deflection $\epsilon$ of the valve-operating members of the follow-up control valves pertaining to the coordinate drive units.

In the embodiment of such a spinning lathe, it is possible to effect a continuous detection of the follow-up path so that, for various phases of the spinning process, it is possible also to choose different limit values of the follow-up path, and when such values are exceeded, changes can be triggered in the route-tracing speed and/or changes in the route geometry.

In case several spinning rollers with a differing geometry of their rolling shoulders are provided for producing a spun part, it is advantageous to scan the spinning chuck with each one of these different spinning rollers, thus accordingly determining so to speak a separate safety curve for each of these spinning rollers.

Additional details and features of the process of this invention and of a spinning machine suitable for its performance can be seen from the following description of a specific embodiment of such a spinning machine with reference to the drawings and the explanation of its function.

BRIEF DESCRIPTION OF DRAWINGS

FIG. 3 shows the arrangement of the spinning chuck and the spinning roller of the spinning lathe according to FIG. 1 on an enlarged scale to explain the function of the spinning lathe.

DETAILED DESCRIPTION OF DISCLOSED EMBODIMENT

Figure 1:
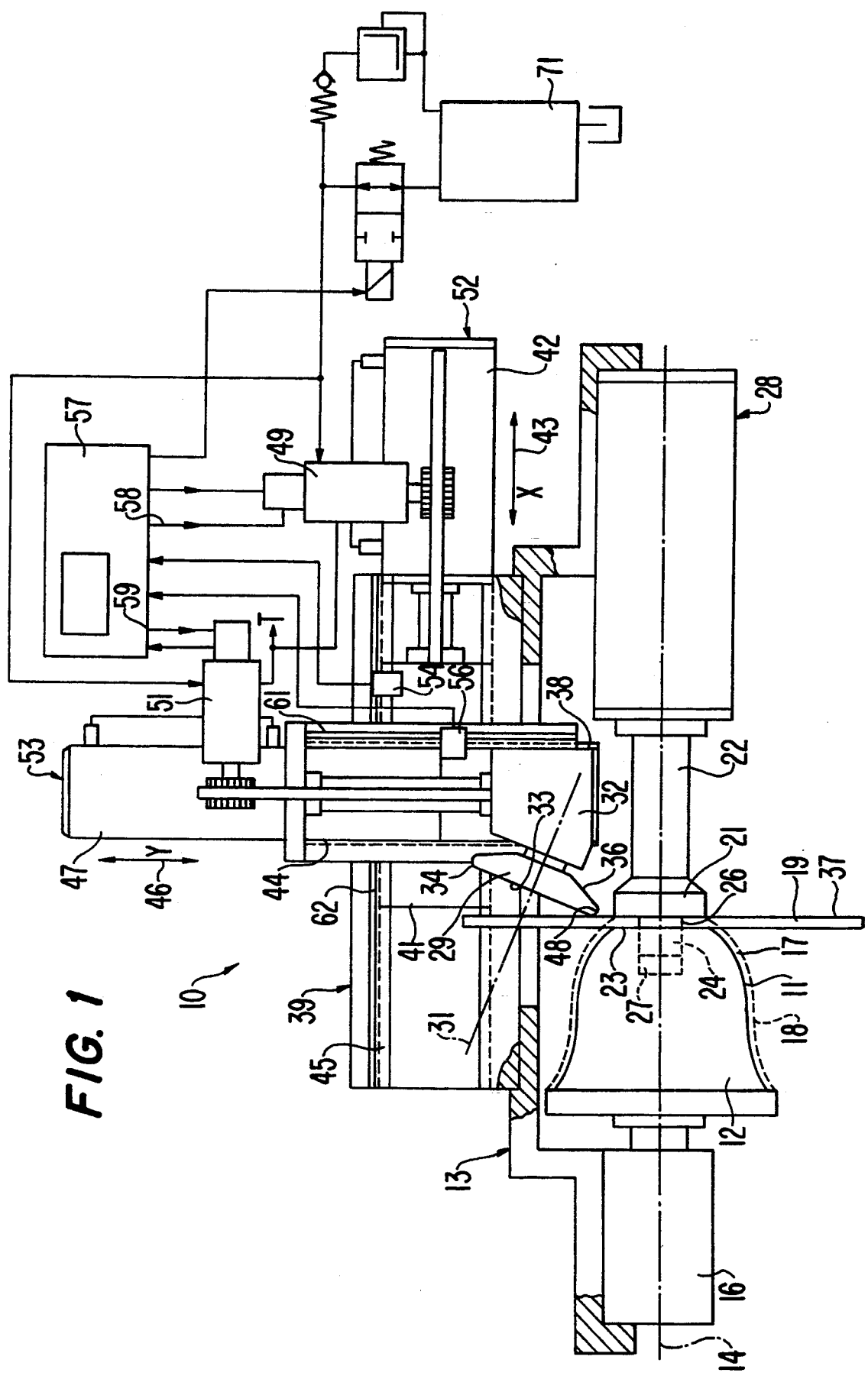
FIG. 1 shows a spinning lathe according to this invention with electrohydraulic X- and Y-coordinate drive units in a simplified schematic top view, FIG. 2 the X-coordinate drive unit of the spinning lathe according to FIG. 1 in a likewise simplified, schematic sectional view.

The spinning lathe of this invention, denoted by 10 in its entirety and shown in FIG. 1, express reference being had to the details of this figure, is suitable in the illustrated, specific structure for the manufacture of a rotationally symmetrical, bell-shaped hollow body. The inner contour of this body is determined by the outer contour 11 of a spinning chuck 12 supported to be rotatable about a horizontal axis 14 at the machine frame denoted by 13 in its entirety and indicated merely schematically. The spinning chuck can be driven rotationally by means of an electrical or hydraulic drive motor 16.

The part 17 to be subjected to spinning, the final outer contour of which denoted by 18 is shown in dashed lines in FIG. 1, is produced from an originally planar sheet-metal cutting 19 having the shape of a circular disk or a circular ring, a so-called round blank. The latter is pressed, by means of a counter stay 21 supported on a sleeve 22 to be rotatable about the horizontal axis 14, against the planar end surface 23 of the spinning chuck 12 facing the counter stay 21 and is held frictionally thereagainst so that the round blank 19 participates, during the spinning process, in the rotational movements of the spinning chuck 12.

The platen 21 is provided with a centering pin 24 passing through a centering bore 26 of the round blank 19 having the same diameter and projecting into a blind bore 27 of the spinning chuck 12 likewise having the same diameter. The sleeve 22 is displaceable by means of a hydraulic linear cylinder 28 along the horizontal axis 14; thereby, the platen 21 can be urged against the round blank 19 and the latter can be pressed against the spinning chuck 12 with adequate force.

The spinning tool in the illustrated embodiment of the spinning lathe 10 is a spinning roller 29 having the shape of a truncated cone. This roller is supported on a solid bearing block 32 to be freely rotatable about an axis 31 extending likewise horizontally at an acute angle of about 25° with respect to the axis of rotation 14 of the spinning chuck 12, in such a way that the basal surface 33 of the spinning roller 29, having the larger diameter, is disposed to be pointing toward the round blank 19, and with the convexly curved marginal zone 34, by way of which this larger basal surface 33 adjoins the conical outer surface 36, the spinning roller 29 can roll along the—outer—surface 37 of the round blank 19 facing away from the spinning chuck 12.

The bearing block 32, on which the spinning roller 29 is rotatably mounted, is attached to the cross slide 38 of a compound slide support denoted by 39 in its entirety. The longitudinal slide 41 of this support can be reciprocated in parallel to the axis of rotation 14 by means of an X-coordinate drive motor 42. The respective displacement directions are illustrated by the double arrow 43 representing the X-coordinate direction.

The cross slide 38 fashioned in the illustrated embodiment as the top slide of the compound slide 39 is guided in its slideways 44 so that it can be reciprocated at a right angle to the axis of rotation 14 of the spinning chuck 12, i.e. in the Y-coordinate direction marked by the double arrow 46. A Y-coordinate drive motor provided for acting as a drive means therefor and participating in the movements of the longitudinal slide 41 is denoted by 47.

The compound slide 39 is affixed to the machine frame 13 with regard to the location of the spinning chuck 12 in such a way that, in case of a movement of the spinning roller 29 taking place in the Y-coordinate direction 46, the rolling-off point 48 of the roller travels along the outer surface 37 of the round blank 19 exactly radially to the axis of rotation 14 of the spinning chuck 12 and/or of the round blank 19.

The coordinate drive motors 42 and 47, as well as the clamping cylinder 28 by means of which the platen 21 can be urged against the round blank 19 and the latter can thereby be placed against the spinning chuck 12, are designed as hydraulic linear cylinders.

Follow-up control valves 49 and 51 are associated in each case individually with the linear cylinders 42 and 47 in order to control the travel paths of the spinning roller 29 required—with the spinning chuck 12 revolving—for the spinning machining of the circular-shaped workpiece 19, these travel paths resulting from the superposition of the X- and Y-piston strokes of the linear cylinders 42 and 47. These valves operate with an electromechanically controllable reference position value presetting and with mechanical actual position value resetting for the movable elements—the pistons—of the two linear cylinders 42 and 47.

The coordinate drive units, denoted in their entirety by 52 and 53, respectively, comprising in each case a linear cylinder 42 and 47, respectively, and a follow-up control valve 49 and 51, will be described in greater detail with reference to FIG. 2 as regards their structure in principle and their function.

The coordinate drive units 52 and 53 are equipped with respectively one position pickup 54 and 56, producing—electrical—output signals characteristic for the positions of the longitudinal slide 41 and the cross slide 38. These signals are transmitted as input to an electronic CNC control unit 57 which issues, from control outputs 58 and 59, the reference position value presetting signals for the follow-up control valves 49 and 51 of the drive units 52 and 53; by the linear movements thereof, the movement path of the spinning roller 29 is controlled.

The position pickups 54 and 56 are designed as so-called absolute pickups in a preferred embodiment; the output signals of these pickups—delivered in digital format—represent a direct measure for the instantaneous positions of the longitudinal slide 41 and, respectively, the cross slide 38 based on basic positions—fixed within the machine—of the longitudinal slide 41 and of the cross slide 38. Such a structure of the position pickups 54 and 56 as absolute pickups, however, has the prerequisite that markings are located along the slideways 44 and 45, respectively, of the cross slide 38 and the longitudinal slide 41, for example within strip-shaped zones 61 and 62, respectively, which are recognizable by the position pickups 54 and 56, in this case designed as reading heads, when sweeping over these markings. The respective Y- and X-coordinate value is coded into the geometrical arrangement of these markings, "recognized" by the position pickups 54 and 56, and converted into pulse-shaped electrical output signals which latter, in turn, are processed as coordinate values in the electronic CNC control unit 57. These markings, not shown for the sake of simplicity, can be realized in a manner known per se as optically scannable or as inductively scannable markings or marking groups.

In place of absolute pickups, incremental pickups can likewise be used as the position pickups 54 and/or 56. These transmit signals—pulse sequences—characteristic for the direction of change—forwards/backwards—and for incremental amounts of positional change. By the additive or subtractive processing of these signals in the CNC control unit 57, the positional information on the arrangement of the spinning roller 29 relatively to the spinning sleeve 12 of the spinning lathe 10 can likewise be obtained with adequate reliability.

Position pickups 54 and 56 of both types, suitable for use with the spinning machine 10, are known in a great variety of designs and thus do not appear to require a detailed discussion.

Corresponding remarks apply analogously for the structure of the hydraulic linear cylinders 42 and 47 of the coordinate drive units 52 and 53, as well as for the structure, function and type of actuation of the follow-up control valves 49 and 51 of the two coordinate drive units 52 and 53. The follow-up control valves 49 and 51 thereof differ from previously known valves of this type in that each is equipped with a measuring system, denoted by 63 in its entirety, for detecting the desired position value as well as for monitoring the follow-up path ΔS by which the piston 64 of the respective linear cylinder 42 or 47 of the X-drive unit 52 or of the Y-drive unit 53 trails after the desired position value introduced into the control operation through output signals of the CNC control unit 57 during the shaping of the workpiece 19.

For the sake of completeness, a description will therefore be set forth with reference to FIG. 2, the details of which are now referred to, using as the example the X-coordinate drive unit 52, of a specific structure of its follow-up control valve 49 and of the measuring system 63 coupled therewith, realized in the Y-coordinate drive unit 53 in an identical or equivalent way.

The follow-up control valve is designed as a 4/3-way valve, the "neutral" basic position 0 of which is its blocked position wherein both drive pressure chambers 66 and 67 of the linear cylinder 42 of the X-coordinate drive 52 are blocked off against the P-supply connection 68 as well as the pressure (P) output as well as with respect to the tank (T) connection of the pressure supply system 71.

Figure 2:
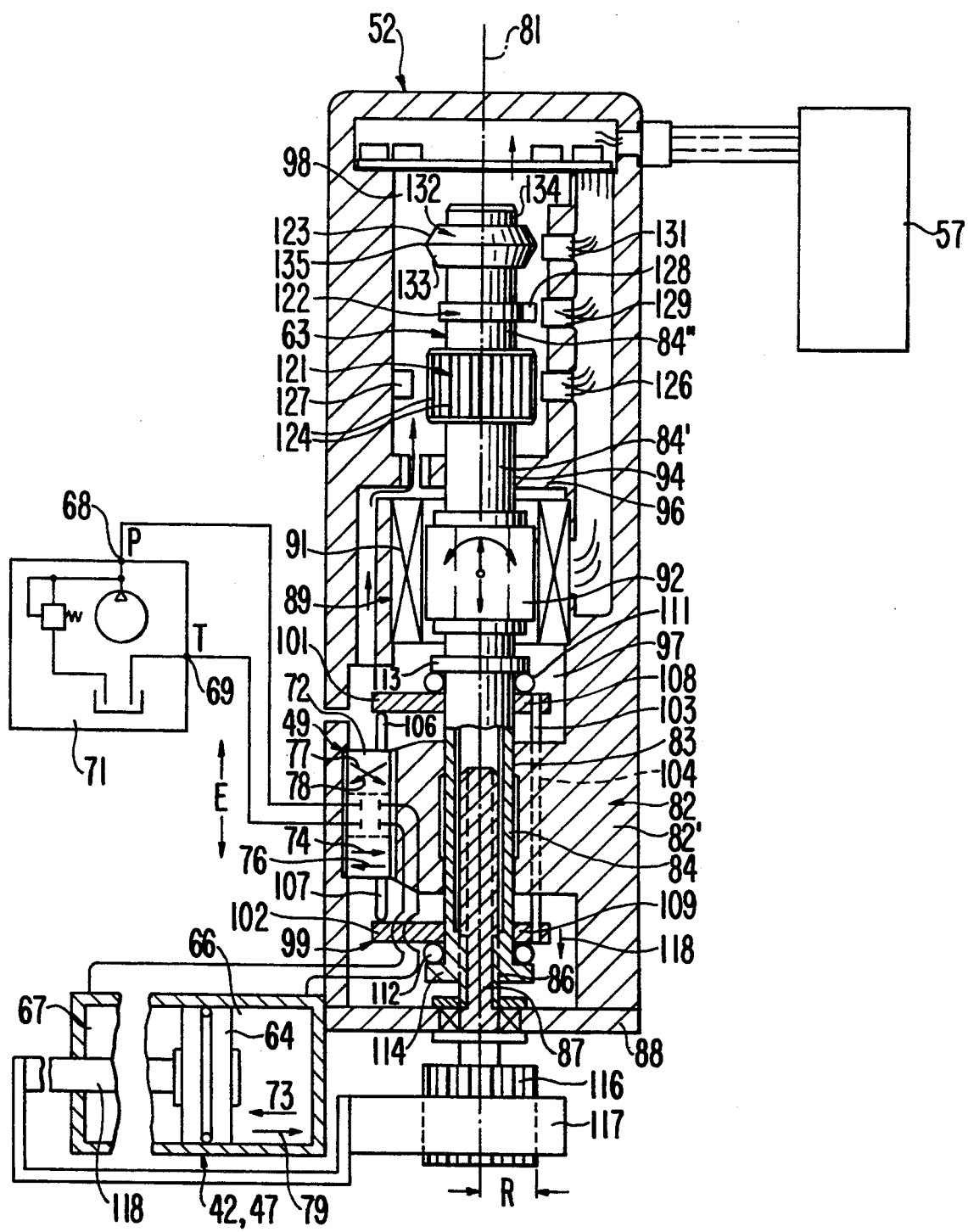

The follow-up control valve 49 is assumed to be—for purposes of explanation—a slide valve in accordance with the semischematic illustration of FIG. 2, the "piston" 72 thereof being represented by the 4/3-way valve symbol. This valve is designed as a proportional valve which, as seen from its blocking basic position 0, vacates increasingly larger cross sections of the throughflow paths 74 and 76 with an increasing displacement of its valve piston 72, according to the illustration of FIG. 2 in the "downward" direction, i.e. along the lines of acting upon the hydraulic cylinder 42 in the direction of arrow 73 toward the "left", i.e. in the direction of movement denoted as the forward direction hereinbelow. With an increasing displacement of its valve piston 72 in the opposite direction, according to the illustration of FIG. 2 in the "upward" direction, the valve vacates increasingly larger cross sections of the throughflow paths 77 and 78; in this functional position of the valve piston 72, the piston 64 of the linear cylinder 42 moves in the direction of arrow 79. This direction is denoted as the "backward" direction hereinbelow.

The functional position of the follow-up control valve linked to the "forward direction" is denoted by I; the functional position linked to the backward direction is denoted by II.

The following functional elements are furthermore provided in order to be able to operate the follow-up control valve 49 as described thus far to move as needed into its various functional positions 0 and I or II, respectively, along the lines of movement control of the piston 64 of the linear cylinder 42 and of the workpiece 19 driven therewith in the X-direction:

A hollow shaft 84 is supported in a rotatable and axially displaceable fashion in a central bore 83 coaxial to the longitudinal axis 81 of the valve housing 82; this hollow shaft is provided with an internal thread 86 on one of its end sections, namely the one at the bottom according to the illustration of FIG. 2. Via this internal thread, the hollow shaft meshes with the outer thread of a central threaded spindle 87 arranged to be rotatable but axially fixed at an end plate 88 of the valve housing 82 forming the bottom end wall of the housing 82.

The hollow shaft 84 can be driven—for providing the reference position value of the drive piston 64 of the linear cylinder 42—by means of an electric motor—a stepping motor or an AC motor—denoted by 89 in its entirety; the current supply of this motor is controlled along the lines of reference position value presetting by electrical output signals from the electronic CNC control unit 57.

This electric motor, in the illustrated specific embodiment, has a stator 91 fixedly mounted to the housing and a rotor 92 that can be reciprocated axially, the rotor shaft of which is constituted by a section of the quill shaft 84, thus connected fixedly with respect to rotation and displacement to the rotor 92 of the electric motor 89. The rotor 92 of the electric motor 89 is rotatably supported in a central bore 94 of a partition 96 of the housing 82, coaxial to the longitudinal axis 81, by means of the section of the quill shaft 84 axially passing through the central bore 83 of the valve housing 82, on the one hand, and, on the other hand, by means of a further extended section 84' of the quill shaft 84. The partition separates the space 97 occupied substantially by the motor 89 and the follow-up control valve 49 from a housing chamber 98 provided for accommodation of the measuring system 63.

A valve-operating member denoted in its entirety by 99 and being of a yoke shape in its basic configuration is located in axially displaceable but nonrotational fashion in the portion 82' of the housing 82 including the follow-up control valve 49; this valve-operating member has two yoke legs 101 and 102 extending in parallel to each other and being fixedly joined by a guide rod 103 extending in parallel to the central longitudinal axis 81 of the housing 82; this guide rod passes through a radially lateral guide bore 104 of the valve housing section 82' that is of a block shape in total. By way of respectively one operating pin 106 or 107, the yoke legs rest axially on the mutually opposite sides of the valve piston 72, the support of the yoke legs 101 and 102 being of a flush—shape-mating type.

The two yoke legs 101 and 102 have mutually aligned bores 108 and 109 coaxial to the central longitudinal axis 81 of the housing 82, the diameter of these bores being slightly larger than the outer diameter of the hollow shaft 84 so that the latter can pass, with a clearance sufficient for ready rotatability thereof, through these bores 108 and 109 of the yoke legs 101 and 102 of the valve-operating member 99.

The valve-operating member 99 is supported without axial play between radial entraining flanges 113 and 114 of the quill shaft 84 by way of ball bearings 111 and 112 providing an easy rotatability of the quill shaft 84 relatively to the valve-operating member 99.

The threaded spindle 87 is provided, at a free end section located outside of the housing 82', with a pinion 116 meshing with a rack 117; the latter is coupled for movement with the piston 64 of the hydraulic linear cylinder 42 and participates in its forward and backward motions.

For explaining the function of the components of the coordinate drive unit 52 described thus far with respect to its structure, it is to be assumed first of all that the linear cylinder 42 is to execute, starting with a rest position wherein the follow-up control valve 49 occupies a blocking position 0, a "forward" motion taking place in the direction of arrow 79. For this purpose, the electric motor 89, fashioned as a motor with reversible direction of rotation is driven—controlled by output pulses from the CNC control unit 57—at such a direction of rotation that its rotor 92 and therewith the hollow shaft 84—on account of its threaded engagement with the threaded spindle 87 which latter remains initially at rest—experience an axial displacement in the direction of arrow 118, in accordance with the illustration of FIG. 2 in the "downward direction". This direction is also transmitted, via the valve operating member 99 executing this introductory displacement together with the hollow shaft 84, to the valve piston 72 of the follow-up control valve 49. The latter thereby passes into its functional position I associated with the forward operation of the hydraulic cylinder 42. The piston 64 of the linear cylinder 42 thus experiences a displacement in the forward direction 73 due to the resultant—increasing—pressurization of one of the drive pressure chambers 66 of the linear cylinder 42, being on the right according to FIG. 2, and simultaneous pressure relief of its other drive pressure chamber 67, being on the left according to FIG. 2. This displacement in the forward direction leads to a rotational movement of the threaded spindle 87 of the same sense as the direction of rotation of the quill shaft 84, on account of the shape-mating meshing engagement of the rack 117, participating in the movements of the piston 64, with the pinion 116. After a "settling" of the control process, requiring only a brief time span, a stationary condition persists wherein the hollow shaft 84 and the threaded spindle 87 have the same number of revolutions and consequently there is cessation of axial displacements of these two elements 84 and 87 with respect to each other. This occurs, in any event, if the frequency of the actuating pulses is maintained constant and the piston 64 of the linear cylinder 42 executes its forward motion at constant speed. In this stationary operating condition, i.e. a condition corresponding to constant velocity of the piston movement, of the coordinate drive unit 52, the valve-operating member 99 is thus "at rest" and the follow-up control valve 49 in its functional position I is opened to such an extent that the oil volume stream dV/dt introduced into the pressurized drive pressure chamber 66 of the linear cylinder 42 and, respectively, removed from its pressure-relieved drive pressure chamber 67 has exactly the value of F·dS/dt; in this connection, F means the value of the pressurized surface of the piston 64 and dS/dt means the advancing speed in the direction of arrow 73.

The mode of operation of the coordinate drive unit 52 in the backward operation of the linear cylinder 42—when the electric motor 89 is activated in the opposite direction—is analogous, wherein merely the effective cross-sectional area of the piston 64, in the illustrated specific embodiment, is smaller by the cross-sectional area of the piston rod 118 to which the rack 117 is firmly connected. In the operating condition of the drive unit 52, stationary along the above-described lines, there is equality between the actual value and the reference value of the movement velocity of the piston 64. However, there is a difference $\Delta S$ between the respectively instantaneously governing reference value of the position of the piston 64 and its actual value; this is the so-called lag path which is proportional to the deflection stroke of the follow-up valve piston 72 from its basic position 0, required for maintaining the stationary condition. In the illustrated embodiment, this difference is defined by the relationship $$\Delta S = \epsilon \cdot i$$

wherein i means the transmission factor of the rack-and-pinion drive 116, 117, given in the illustrated specific embodiment by the ratio of R/r of the effective radius R of the pinion 116 to the radius r of the threaded spindle 87.

By this follow-up path $\Delta S$, the actual position value of the piston 64 lags behind the introduced reference position value in the stationary operating condition.

The measuring system 63 comprises, in total, three pickup elements 121, 122 and 123, in their basic configuration being substantially rotationally symmetrical. These pickup elements are arranged, with the pattern shown in FIG. 2, at mutual axial spacings, secure from rotation and displacement, on the end section 84" of the quill shaft 84 projecting into the housing chamber 98. The first mechanical pickup element 121 has the shape of a gear wheel with teeth 124 extending in parallel to the central longitudinal axis 81 of the quill shaft 84. These teeth, when traveling past electronic sensor elements 126 and 127 mounted fixedly to the housing, trigger pulse-shaped alternating voltage output signals of these sensor elements 126 and 127, i.e. sequences of voltage pulses varying between a maximum level and a minimum level, the pulse shape thereof corresponding at a predetermined speed of the quill shaft 84 and/or of the rotor 92 of the electric motor 89 in a very good approximation to a sine wave.

So-called field plate sensors of a conventional type of structure are utilized as the sensor elements 126 and 127 wherein the amplitudes of the output signals are independent of the rotational speed of the mechanical pickup element 121, i.e. the signal level of their output signals varies between defined—upper and lower—extreme values so that the output signals of the two sensor elements 126 and 127 can be readily evaluated also with respect to their level.

The two sensor elements 126 and 127 are arranged at such an azimuthal distance $\Delta\phi$ from each other that a phase shift of 90° and, respectively, an odd multiple of 90° exists between their output signals so that also the direction of revolution of the quill shaft 84 can be detected from a continuous monitoring of the time curve of the output signals of the two sensor elements 126 and 127 and the time changes (time differential quotients) thereof.

This evaluation of the sensor output signals takes place in accordance with known algorithms in the electronic CNC control unit 57 which latter is fed with the output signals of the two sensor elements 126 and 127.

The gear-wheel-shaped pickup element 121 and the sensor elements 126 and 127 associated therewith thus form an angular position measuring system, the accuracy of which is the higher, the larger the number of teeth 124 equidistantly distributed over the circumference of the pickup element 121, and the higher the accuracy with which the output signal amplitudes of the two sensor elements 126 and 127 can be measured. The measuring accuracy in this respect permits the exact detection of the angular spacing of two successive teeth to 1/100 of its amount.

The second mechanical pickup element 122 rotating with the hollow shaft 84 is fashioned as an element having the shape of an annular flange exhibiting on its circumference only a single, for example V-shaped slot or a pointed projection 128; a reference pulse is in each case triggered when this projection sweeps past an electronic sensor element 129 associated with this pickup element 122 and being fixedly mounted at the housing.

By the occurrence of the reference pulse of this electronic sensor element 129, the structure of which is analogous to that of the sensor elements 126 and 127 of the angular position measuring system 121, 126, 127, a reference plane is marked, so to speak, on which the angular positions of the hollow shaft 84, detectable within one revolution of this hollow shaft 84 by means of the two sensor elements 126 and 127, can be based. By means of the angular position pulses and number of revolution pulses occurring at a specific direction of rotation of the quill shaft 84, which pulses are transmitted by the sensor elements 126 and 127 as well as optionally 129, it is thus possible in a simple way to control the reference position value presetting for the drive piston 64 of the hydraulic cylinder 42. In other words, by means of the angular position measuring system 121, 126, 127 and the reference measuring system 122, 129, the introduced reference position value or X-coordinate reference value, in case of the drive unit 53 the Y-coordinate reference value, can be detected.

The pickup element 121 having the shape of a gear wheel and the annular-flange-shaped pickup element 122, as well as the electronic sensor elements 126 and 127 and, respectively, 129 associated therewith are arranged and designed so that the output signals of at least the two sensor elements 126 and 127 of the angular position measuring system 121, 126, 127 are not affected by the axial displacements of the quill shaft 84, possible during operation, and thus also of the pickup elements 121 and 122, since the output signals of the two sensor elements 126 and 127 are to be evaluated with maximum accuracy also with regard to the amounts of their amplitudes (signal level).

This is not absolutely required for the reference measuring system 122, 129, although it is also of advantage in this case not to vary the amplitudes of the output signals produced by the sensor element 129 at least drastically, with axial shifting of the annular-flange-shaped pickup element 122.

In distinction thereto, the component system of the measuring system 63 comprising the third rotating pickup element 123 and at least one further electronic sensor element 131 likewise affixed to the housing is designed so that the output signal level of the output signals produced by the sensor element 131 of this component system 123, 131 varies significantly and in a maximally exactly linear relation with axial shifts of the pickup element 123 or of the quill shaft 84. This is for the purpose to be able to determine with adequate accuracy the follow-up path $\Delta S$, governing in each case in the operation of the coordinate drive unit 52, from the respective variation and/or the respective level of the output signal from the sensor element 123.

For this purpose, the mechanical pickup element 123 of the follow-up path measuring system 123, 131, in the simple structure of the latter derivable from FIG. 2, is designed as an annular rib with conical flanks 132 and 133 adjoining each other along a sharp annular edge 134; by the axial displacements thereof relatively to the sensor element 131, the output signal level of the latter is influenced in a defined manner.

The sensor element 131 is, in turn, an element of that type as described above for the angular position measuring system 121, 126, 127. Along the lines of providing a simple evaluation possibility for the level of the output signals from the sensor element 131 in units of the lag path $\Delta S$, it is advantageous to link, with the—blocking—basic position 0 of the follow-up control valve 49, a position of the mechanical pickup element 123 wherein the output signal of the sensor element 131 of the lag path measuring system 123, 131 corresponds to a—high or low—extreme value so that changes of the output signal level of the sensor element 131 in each case are in a monotonous correlation with the lag path $\Delta S$ in one or the other direction.

An adjustability of the lag path measuring system 123, 131 required in this respect is realized in the illustrated embodiment by the feature that the pickup element 131 can be threaded to a thread 134 of the hollow shaft end section 84″ and is thereby arranged to be displaceable in a defined way in the axial direction and can be fixed in place by means of a retaining nut, not shown.

A control process for the path motions of the spinning roller 29 of the spinning lathe 10, which is likewise a subject of this invention, will be described below with reference to FIG. 3, referring to the details of this figure.

The purpose of this process resides in obtaining, in a series production of several identically shaped articles, for example, as illustrated, bell-shaped lampshades, an exact reproducibility of the form of these lampshades as well as a uniformly good quality of the inner and outer surfaces of these shades; the contours of these surfaces are determined by the outer contour 11 of the spinning chuck 12 and the path of motion of the rolling-off point 48 of the spinning roller 29 against the outside 18 of the spinning blank 17, traversed in the final round of the spinning roller 29 wherein the spinning blank 17 receives its final shape. The term "round" here means a working cycle, during the course of which the spinning roller 29 is moved once over the entire X-coordinate variation range within which shaping of the spinning blank 17 is required in order to pre-spin the latter in optionally several preliminary rounds to such an extent that finally, in a last round, the final configuration with the outer contour 18 is obtained. Under practical conditions, numerous cycles are performed in order to make the spinning blank approach more and more its final shape before it finally hugs, with its inner surface 11′, the outer surface 11 of the spinning chuck 12 and thereafter, in optionally again several rounds, with reduction of its thickness, is stretched to such an extent that it finally obtains its finished form.

Figure 4:
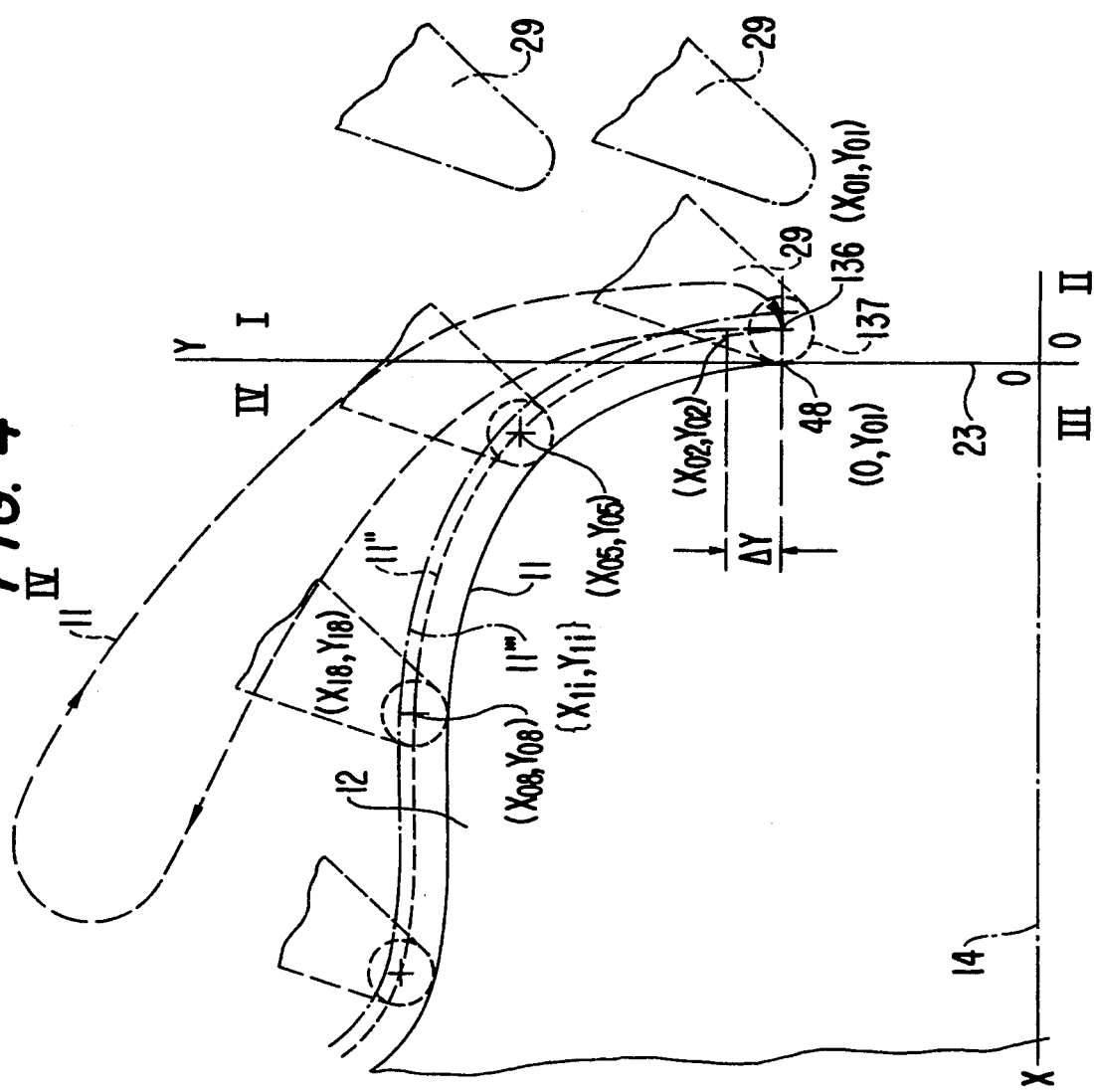

Reference is now also had to the details in FIG. 4 to explain a simple programming process according to which the motion processes of the spinning roller 29 required for the spinning procedure can be introduced into the CNC control unit 57, rendering the latter capable of automatically controlling the spinning steps to be repeated on a plurality of workpieces.

First of all, the contour 11 of the spinning chuck 12 is scanned, and a set of position coordinates ($X_{01}$, $Y_{01}$; $X_{02}$, $Y_{02}$; ...; $X_{0n}$, $Y_{0n}$) representing this contour is introduced as nodes into the electronic CNC control unit 57 and stored therein.

This CNC control unit 57 will be described below merely with regard to its function; upon obtaining this knowledge, a person skilled in the art of CNC control technique can realize this control unit 57 by the usual means of computer and data processing technology so that an explanation of structural and circuitry details of the CNC control unit 57 does not appear to be necessary.

When scanning the contour 11 of the spinning chuck 12, the spinning roller 29, including its X- and Y-coordinate drive means 52 and 53, is itself utilized as the scanning head.

In order to keep the number of coordinate data to be stored within limits, the scanning in the X-direction parallel to the longitudinal axis 14—the axis of rotation—of the spinning chuck 12 takes place in discrete stepping intervals $\Delta X$ which, if necessary, can be varied.

In an—arbitrarily chosen—coordinate system wherein the X-axis is congruent with the central longitudinal axis 14—the axis of rotation—of the spinning chuck 12, and the Y-axis extends in the —planar—end face 23 of the spinning chuck 12 radially, i.e. at a right angle to the X-coordinate axis 14, scanning is begun at that point of the outer contour 11 of the spinning chuck 12 from which on a shaping of the round blank 19 is required for making the blank hug the course of the outer surface or contour 11 of the spinning chuck 12.

With this choice of the X-Y-coordinate system, the contour 11 to be scanned lies in the IV-th quadrant thereof. In the initial position of the spinning roller 29 provided for the scanning step, the roller is located—"somewhere"—in the I-st quadrant of this coordinate system, for example in the position shown in dashed lines, wherein the inside axial spacing of the spinning roller 29 from the end face 23 of the spinning chuck 12 is markedly larger than the maximum thicknesses of the processable workpieces 19.

The initial point of the scanning step having the coordinates $X_{01}$ and $Y_{01}$ is approached by moving the spinning roller 29 from its initial position shown in dashed lines by a—for example "hand-operated"—activation of the Y-coordinate drive unit 53 into the position indicated in dot-dash lines wherein the center of curvature of the rolling surface 137 of the spinning roller 29, presupposed to be curved in the manner of a circular arc, has the Y-coordinate value of $Y_{01}$. While the Y-coordinate drive unit 53 is retained in this position of the piston 64 of its linear cylinder 47—by hydraulic or mechanical "locking"—the linear cylinder 42 of the X-coordinate drive unit 52 is exposed to a moderate pressure amounting to between 1/20 and ⅛ of its maximum operating pressure. Thereby, the spinning roller 29 is urged in point $(0, Y_{01})$ into contact with the end face 23 of the spinning chuck 12. The position output signals of the X-position pickup 54 and of the Y-position pickup 56 characteristic for this position of the spinning roller 29 are stored as coordinate input $(X_{01}, Y_{01})$ in the electronic CNC control unit 57, this coordinate pair $(X_{01}, Y_{01})$ representing the position of the center of curvature 136 of the spinning roller 29. Next, by activation of the Y-coordinate drive unit 53, the position $X_{01}, Y_{02}$ of the center of curvature 136 of the spinning roller 29 is covered while the X-coordinate drive unit 52 is "locked" in the value corresponding to the coordinate value $X_{01}$ of the center of curvature 136 of the spinning roller 29. Thereupon, the Y-coordinate drive unit 53 is locked in the position of its piston 64 corresponding to this position of the center of curvature 136 of the spinning roller 29, and thereafter again the X-coordinate drive unit 52 is pressurized along the lines of advancing in the X-direction, i.e. toward the spinning chuck 12 until standstill of the piston 64 of the linear cylinder 42 of the X-coordinate drive unit 52 has again been achieved. The output signals of the X-position pickup 54 and of the Y-position pickup 56 linked with this position of the spinning tool 29 are, in turn, stored in the electronic control unit 57 as coordinate input $X_{02}, Y_{02}$. During this step, the stepwise change $\Delta Y$ by which the coordinate scanning is altered in the Y-direction is initially maintained constant.

If, during the course of scanning of the outer contour 11, a region thereof is reached wherein the slope of the outer contour 11 in the X-/Y-coordinate system becomes smaller in its amount than 1, which is the case according to the schematically greatly simplified illustration of FIG. 4 starting with the fifth scanning step, then the width of the Y-steps is reduced, for example to the value $\Delta Y/2$, and thereafter scanning is continued analogously until, in the illustrated example with the eighth scanning step, a course of the outer contour has been obtained wherein the slope has the value 0, i.e. the outer contour 11 extends in parallel to the X-axis 14. Accordingly, the rolling-off point 48 of the spinning roller 29, according to the illustration in FIG. 4, is arranged exactly "underneath" the center of curvature 136 of the rolling surface 137 whereas, at the beginning of the scanning step, the rolling point 48 of the rolling-off surface 137 of the spinning roller 29 was located in a lateral distance, corresponding to the radius of curvature R, from the center of curvature 136 of the rolling surface 137.

As soon as the scanning of the contour 11 of the spinning chuck 12 has reached a region wherein the slope thereof is, in its amount, 0 or only very little different from 0, the scanning interval $\Delta Y$ is further reduced in the Y-direction, for example to 1/10 of the initial value, and then scanning is continued as described above. It is thereby possible to, so to speak, "jump over" relatively large segments in the X-direction without losing any scanning accuracy.

Depending on the amount of the radius of curvature R of the rolling-off surface 137 of the spinning roller 29, it is possible, after reaching a zone of the scanning contour 11 wherein the latter extends "horizontally", i.e. in parallel to the X-axis, to choose a step width in the Y-direction corresponding, for example, to 1/100 of that step width by selected for the scanning step in case the outer contour 11 extends very steeply with respect to the X-axis, i.e. wherein the slope of the outer contour 11 is larger than 1.

Depending on the evolution of the slope of the outer contour 11 pertaining to the spinning chuck during the further course of the scanning operation, it is possible to analogously select—with the of the above-described criteria—the Y-step widths of the scanning procedure.

From the thus successively engaged positions of the spinning roller 29 and the coordinate data stored for these positions, the CNC control unit 57 determines by interpolation the complete track curve 11" along which the center of curvature 136 of the rolling surface 137 of the spinning roller 29 travels when the latter is guided directly along the outer contour 11 of the spinning chuck 12.

In the aforedescribed scanning operation, the spinning chuck 12 is not driven in rotating fashion.

Figure 5:
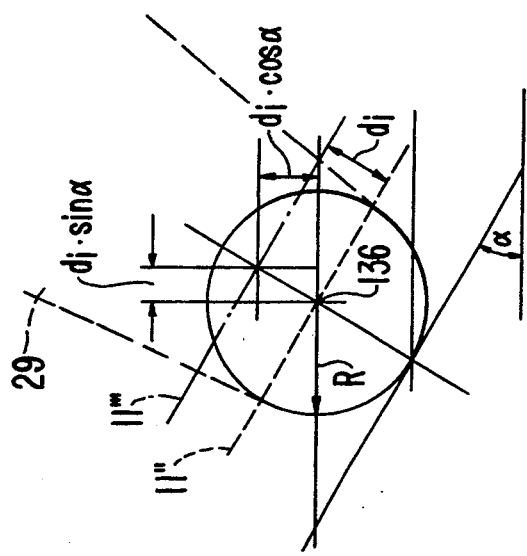
FIGS. 4 and 5 show various arrangements of the spinning roller and the spinning lathe according to FIG. 1 with respect to each other to explain scanning procedures and phases of motion control of the spinning roller of the spinning lathe according to FIG. 1.

The track 11''' illustrated in dot-dash lines in FIG. 4 and in FIG. 5, the details of this latter figure being referred to as supplemental information, is the track along which the spinning roller 29 and/or its rolling surface center of curvature 136 must be guided in the "final" spinning round by means of which the finished article receives its final outer contour 18. This track is obtained from the track 11"—shown in dashed lines— produced by scanning the outer contour 11 of the spinning chuck 12 by the feature that the desired thickness—perpendicularly to the course 11″ of the curve—measured perpendicularly to the outer contour 11 of the spinning chuck 12, is added to each point of this "scanning motion path" 11″, so that there result, from the point coordinates $X_{0i}$, $Y_{0i}$, i=1, 2, . . . n), for the individual points of the track curve 11′ its point coordinates ($X_{li}$, $Y_{li}$) in accordance with the following relationships:

$$X_{li}=X_{0i}-d_i \sin\alpha_i \quad (1)$$

and $$Y_{li}=Y_{0i}+d_i \sin\alpha_i \quad (2)$$

wherein $d_i$ means the desired thicknesses at the nodes with the coordinates $X_{li}$, $Y_{li}$ of the path traversed in the final spinning revolution, and $\alpha_i$ means the angles of inclination of the outer contour 11 of the spinning chuck 12 associated with the coordinate values correspondingly being provided with "i" indices, measured from the X-axis 14. These angles $\alpha_i$ are determined by calculations by the control unit 57 from the coordinate data $X_{0i}$, $Y_{0i}$ of the track curve 11″ of the center of curvature of the spinning roller 29. Since the path curve 11′ is determined by calculation, for example as an interpolation polynomial of a given order, e.g. the 6th order, which is laid with a smoothly curved course over the scanning nodes, the angles of inclination $\alpha_i$ can also be determined for points along the track between the scanning sites. Of course, a prerequisite of this is that the step widths of the scanning operation in the X- and Y-directions are adequately small. Under practical conditions, the step widths involved here can be around 1 mm, but they can also be chosen to be smaller, or, within those ranges wherein the track 11″ extends "in parallel" to the X-axis 14, to be very much larger.

The path motions of the spinning roller 29 required for performing pre-spinning revolutions of the roller are introduced into the electronic control unit 57 and are, so to speak, "learned" by the latter, in such a way that an expert in the spinning lathe art, in a master spinning process, regulates the spinning step, for example by means of a manually operable hydraulic control device conveying a return signal regarding the occurring counterforces, or solely "by hand", i.e. in a conventional way. In this procedure, in dependence on given step widths X and/or ΔY, the coordinate pairs ($X_{iv}$, $Y_{iv}$) reached during the course of the prespinning movements (index "v") , which are produced as output signals of the X- and Y-position pickups 54 and 56, are continuously read into the CNC control unit 57 and stored therein in the sequence with which they have been traversed, and are available for call-up.

In order to determine herein the most favorable motion process with a view toward a brief duration of the spinning step and optimum surface quality of the finished article 17, several master spinning processes are normally performed.

In order to illustrate such a pre-spinning process, a motion path 11′′′′ characteristic thereof is indicated schematically in FIG. 4.

Repetition of the pre-spinning motions of the spinning roller 29 takes place according to the so-called "playback" method according to which the coordinate data determined by the manual spinning process, which have been stored in the CNC control unit 57, are converted into reference position value presetting signals suitable for activation of the coordinate drive units 52 and 53.

During the course of such rounds of rotation, the lag path $\Delta S_x$ of the linear cylinder 42 of the X-coordinate drive unit 52, detected by means of the pickup element 123 and the sensor element 131 of the measuring system 63, as well as the lag path $\Delta S_y$ of the linear cylinder 47 of the Y-coordinate drive unit 53 are monitored, at the latest, during the final revolution of the spinning roller 29 through which the spun part 17 receives its final shape, suitably also already in the preceding revolutions during which the spun part 17 is already in contact with the outer contour 11 of the spinning chuck 12 but has not as yet its final outer contour 18, the final shape of the latter often being obtained only after a plurality of further revolutions. Signals characteristic for the values of such lag paths are passed on to the CNC control unit which latter forms, from these inputs $\Delta S_x$ and $\Delta S_y$, a comparison variable ΔS increasing monotonously therewith, continuously compares this comparison variable with a threshold value $\Delta S_{max}$ and, once the comparison variable ΔS exceeds the reference threshold value $\Delta S_{max}$, triggers control signals for changing the path motions of the spinning roller to the effect that the comparison variable ΔS again falls below the threshold value $\Delta S_{max}$. The following measures suitable in this respect are provided; these can be utilized alternatively or in combination:

1. Reduction of the travel velocity of the spinning roller 29 by decreasing the time rate with which the presetting of the reference position value takes place for the two coordinate drive units 52 and 53; and 2. Switchover of the travel path of the spinning roller 29 to a track lying between the path traversed in the preceding revolution and that path of motion wherein, when traversed, the lag path threshold value $\Delta S_{max}$ has been exceeded, until the threshold value $\Delta S_{max}$ is passed again in the downward direction by a defined safety margin ΔS'.

A suitable combination of the aforementioned measures resides in utilizing them in the recited sequence, i.e. first to reduce the path-tracking velocity and only then to broaden the path of motion radially. When selecting herein the path radii based on the central axis 14 in each case to be equal to the arithmetic mean of the reference values, based on the central axis 14, of the path last commenced, namely that during which the threshold value $\Delta S_{max}$ has been exceeded, and of the path traversed—before the former—as the last one without disturbance, i.e. without exceeding the threshold value $\Delta S_{max}$, then the thus-obtained track courses very quickly converge toward a path which can be traversed without exceeding the threshold value $\Delta S_{max}$.

Whenever—with automatic control—one or both of the aforementioned measures have been utilized —once or repeatedly—in order to guide the spinning roller 29 in a track course, deviating from a preprogrammed, learned path, over the coordinate variation range of a revolution, the preprogrammed revolution which has not been possible "at first try" is subsequently put into operation again. After this, once this revolution could be performed, the control of the motion path in accordance with the subsequent preprogrammed track course is again operative; otherwise, the aforedescribed procedure is once again repeated under automatic control until conditions are regained making it possible to continue the spinning process according to the "learned" procedure.

This "return" to the track courses learned by the master spinning process is expedient since changes of such track courses generally will constitute the exception. Yet it is likewise advantageous to consider changes, once made, also for further spinning processes, and to insert these changes in the program learned in the master spinning process and retain such changes.

In order to be able to make do with a single threshold value $\Delta S_{max}$, it is advantageous for the CNC control unit 57 to process the lag path inputs $\Delta S_x$ and $\Delta S_y$ in accordance with the relationship $$\Delta S = \sqrt{\Delta S_x^2 + \Delta S_y^2} \qquad (3)$$

Furthermore, it is expedient for the aforementioned purpose if the path movements for the successive revolutions are programmed or "learned" in the master spinning process in such a way that the variable $\Delta S$ formed according to the relationship (3) varies then only within narrow limits of, for example ±20%, assuming an exact reproducibility of the learned spinning process and presupposing identical nature of the round blank to be subjected to the forming step.

Such a programming of successive spinning rounds on a so-to-speak "constant" total lag path of both coordinate drive units 52 and 53 can be performed —as to its basic idea—as follows:

After determining, by a master spinning process, an optimal route for the path of the spinning roller 29 for the pre-spinning rounds as well as for the final round, or after obtaining this optimal route for the path by averaging over several ones of such master spinning processes, the spinning roller 29 is guided, controlled by the CNC control unit 57, at a constant path tracking velocity $V_B$, along the optimum track guiding data, without there being clamped into the spinning lathe 10 any workpiece 19 to be formed. Both follow-up control circuits of the coordinate drive units 52 and 53 are operated with very small circuit amplification, and the lag path components $\Delta S_x$ and $\Delta S_y$ as well as the comparison variable $\Delta S$ are continuously determined and/or recorded.

Thereby—on account of maintaining the track velocity constant—there is obtained in the final result a path-dependent profile of the lag path in the working range.

From this path- and, respectively, location-dependent profile of the lag path $\Delta S$, it is possible, since this path is proportional to the track velocity, to calculate a location-dependent profile of the path tracking velocity resulting finally in a constant or almost constant lag path $\Delta S$ if the velocity is controlled in accordance with the velocity profile. This is possible in a simple way by reduction or increase of the time rate with which the reference position value presetting data are delivered by the electronic CNC control unit 57.

The configuration and design of the CNC control unit 57 required for this purpose can readily be provided by a person skilled in the art when knowing the problem involved, so that the description of such details regarding the circuitry is unnecessary.

According to such a programming procedure, the path movement of the spinning roller 29 thus proceeds along the programmed reference contours at a variable speed but, in turn, with a constant or almost constant total lag path so that exceeding of a threshold value $\Delta S_{max}$ thereof is also a sufficiently reliable evidence of the fact that the spinning process does not take place at an optimum. This, however, is correctable and/or avoidable in a simple way—with regard to the result of the operation—by means of the measures recited in (1) and (2).

Programming of the path motions of the spinning roller 29 can be continuously improved, in principle, by utilizing changes in the path motions that have occurred in a spinning process and can be detected by means of the position pickups 54 and 56 also during the course of serial production of spun parts and can be introduced into the CNC control unit 57, during the spinning of the subsequent part and further parts as a basis for regulating the path motions. A "self-programming" of the spinning lathe to the optimum motion route is possible when designing the spinning lathe 10 with this capability of "remembering" the path motions of the spinning roller in the respectively preceding phase of a spinning process, after determining, in a relatively uncomplicated master spinning process, a moderately favorable course of motion, so to speak along the lines of a first approximation.

Therefore, it is unnecessary to optimize already the master spinning process, which would be highly time-consuming. Rather, it is sufficient, so to speak, to preset a moderately favorable course of the path motions of the spinning roller 29, and leave programming to optimum routes of the spinning roller 29 up to the spinning lathe 10 proper.

In a specific embodiment of the spinning machine 10 and mode of operation for the working control of this machine, the provision is made that a set of coordinate data is produced, from the set of coordinate data obtained by scanning the outer contour 11 of the spinning chuck 12 by adding axial coordinate increments and radial coordinate increments $\delta X$ and, respectively, $\delta Y$, corresponding to a safety contour extending at a minimum distance from the outer contour 11 of the spinning chuck 12 and within the reference contour of the spun part 17 to be produced. When this safety contour is crossed over by the rolling-off point 48 of the spinning roller 29, a control signal is triggered initiating at least one of the following safety measures:

1. Cutting off the coordinate drive units 52 and 53.
2. Reducing the circuit amplification $K_v$ of the follow-up control circuits of the coordinate drive units 52 and 53, given by the relationship $$K_y = v/\Delta S$$

and/or

3. Triggering an acoustic and/or optical warning signal.

In a further specific mode of operation of the spinning lathe 10, scanning of the outer contour 11 of the spinning chuck 12 can be performed in such a way that, during a first revolution of the spinning roller 29 leading across the coordinate variation range, one of the two coordinate drive units 52 or 53 is exposed to a constant, low drive pressure whereas the other coordinate drive unit 53 or 52 is activated with a defined, preferably time-constant output rate of the coordinate reference value data to be attained in one revolution of the spinning roller. Thereafter, during the course of a second revolution of the spinning roller extending across the coordinate variation range, the other one of the two coordinate drive units 53 or 52 is exposed to a constant, low drive pressure whereas the one coordinate drive unit 52 or 53 is operated with the relatively higher circuit amplification and is activated with a defined, for example time-constant output rate of the coordinate reference value data to be attained in one revolution of the spinning roller 29. Thereby the lag paths ΔS(x) and, respectively, ΔS(y), occurring in the control circuit 52 or 53 operated with the higher circuit amplification are permanently recorded and stored. From the thus-determined coordinate-dependent lag paths ΔS(x) and ΔS(y), a location-dependent profile of the path tracking velocity $V_B(xy)$ of the spinning roller 29 is obtained which, as seen across the path motion, corresponds to an at least approximately constant value of the lag path $$\Delta S(x, y) = \sqrt{\Delta S(y)^2 + \Delta S(x)^2}.$$

If, as explained with reference to FIG. 2, the follow-up path measuring system 123, 131 provided in combination with the angular position measuring system 121, 126 and the reference measuring system 122, 129 has the capability of producing an output signal directly proportional to the lag path, which output signal can thus be calibrated in units of the coordinate system, then the measuring system 63 encompassing these three measuring systems in their entireties is also suitable for detecting the actual position value of the spinning roller 29. This actual position value can then be obtained from a subtraction of the lag path output of the lag path measuring system 123, 131 from the reference position value output of the combined angular position and reference measuring system 121, 126, 127 and, respectively, 122, 129.

The position pickups 54 and 56 are no longer needed in this case, and the contour 11 of the spinning chuck 12 can be determined in a lag-controlled scanning step by covering the nodes provided for scanning purposes. In this process, starting with a position of the spinning roller 29 wherein the latter is located at a radial and axial minimum inside spacing from the node of the spinning chuck 12 to be covered first of all, one of the two coordinate drive units, for example the X-drive unit 52 is initially activated for the execution of an incremental scanning stroke ΔX while the Y-drive unit 53 is retained; then the X-drive unit is arrested and thereupon the Y-drive unit 53 is moved at a predetermined speed given by the output rate of incrementally staggered reference position value data by the CNC control unit 57 radially up to contact of the spinning roller 29 with the spinning chuck 12. As soon as the lag path $\Delta S_y$, increasing upon impingement of the spinning roller 29 against the spinning chuck 12, has reached a preset value $\Delta S_{ym}$, the Y-drive unit 53 is arrested. As the Y-coordinate value for the contour node, the reference value is stored which is reduced by the lag path $\Delta S_{ym}$ and forms the basis for engaging this position. Thereafter, the Y-coordinate drive unit 53 is then actuated with the Y-position reference value associated with the node and is arrested in this position, and the spinning roller 29 is urged out of this position by activating the X-drive unit 52 and then this roller is, in turn, moved at constant speed $v_x$ toward the node having the X-coordinate to be determined. After the lag path $\Delta S_x$ in the X-direction has reached the value corresponding in its amount to the value $\Delta S_y$, the reference value of the activation, reduced by the lag path $\Delta S_{xm}$ measured in the direction, is again stored as the X-coordinate value of the node.

We claim:

1. Process for controlling the revolving path motions of the spinning roller of a spinning lathe comprising forming a round-blank sheet-metal workpiece by pressing said workpiece against a rotationally drivable spinning chuck, into a spun part unilaterally hugging a shaping surface of the spinning chuck, wherein the spinning roller is supposed to be freely rotatable, on a bearing block shiftable by means of respectively one coordinate drive unit into two mutually orthogonal (X- and Y-) directions, about an axis fixed at the block, and wherein the activation of the coordinate drive units, fashioned as valve-controlled hydraulic cylinder, takes place according to a track repetition (playing-back) process, in accordance with which, in at least one master spinning process, coordinate data characteristic for the thus-traversed positions of the spinning roller and determined with the aid of position pickups are stored in an electronic NC or CNC control unit and are processed by the latter to output data, the X- and Y-coordinate drive units being actuatable by the serial call-up of these output data along the lines of tracking the course of travel of the spinning roller determined during the master spinning process, and wherein initially the contour of the spinning chuck is scanned, and a set of coordinate data characteristic for the configuration of such contour is introduced into the NC or CNC control unit, a safety curve being determined from these data which marks the limit of a closest possible approach of the spinning roller toward the spinning chuck, said process further including (a) operating the coordinate drive units are according to a follow-up control process working with electrically controlled reference position value presetting and mechanical actual value acknowledgement, (b) utilizing the spinning roller and the drive units provided for the motion control thereof for said scanning of the outer contour of the spinning chuck, wherein these drive units are operated only with less then the maximally usable control circuit amplification, and (c) continuously measuring the follow-up path ΔS (lag error) corresponding to the difference between the set reference position value and the actual position value of the spinning roller at least during the last revolution of the spinning roller through which the spun part received its final shape, and wherein, when this measured follow-up path ΔS exceeds a threshold value $\Delta S_{max}$, taking at least one of the following measures:

reducing the path tracking velocity $V_B$ of the spinning roller by decreasing the control data output rate, and
transitioning to a path routing curve of the spinning roller and thus of its rolling-off point corresponding to an increase of the distance of the spinning roller rolling-off point, measured normally to the outer contour of the spinning chuck, with respect to its previously governing reference value curve, until the threshold value $\Delta S_{max}$ has been exceeded in the downward direction by a defined amount δS.

2. Process according to claim 1, wherein the nodes are covered provided for scanning the contour of the spinning chuck by first activating, starting with a position of the spinning roller wherein the latter is located at a radial and an axial inside minimum distance from the node of the spinning chuck to be covered, one of the two coordinate drive units, e.g. the X-drive unit while the Y-drive unit remains retained, for performing an incremental scanning stroke ΔX, then is itself arrested and thereupon the other coordinate drive unit, the Y- drive unit is moved with a predetermined velocity $v_y$—radially—up into engagement of the spinning roller with the spinning chuck and, as soon as the follow-up path $\Delta S_y$, increasing with the impingement of the spinning roller onto the spinning chuck, has reached a predetermined value $\Delta S_{ym}$, the reference value data output is terminated, the Y-drive unit is arrested, and, as the Y-coordinate value for the contour node, the reference value is stored which is reduced by the follow-up path $\Delta S_{ym}$ and forms the basis for covering this position, whereupon then the Y-drive unit is activated with the Y-position reference value associated with the node, and is arrested in this position, and the spinning roller, by activation of the X-drive unit, is displaced from this position and then, in turn, is moved at constant velocity $v_x$ toward the node with the presently determined Y-coordinate, and, after the follow-up path $\Delta S_x$, in the X-direction, has reached a value corresponding in its amount to the value $\Delta S_{ym}$, the reference value $X_s$ of the activation, reduced by the follow-up path $\Delta S_{xm}$ measured in the X-direction, is stored again as the X-coordinate value of the node.

3. Process according to claim 1 or claim 2, wherein the path routing coordinates of one revolution of the spinning roller, where a transition has been made in the path tracking thereof from a preprogrammed route to a radially broadened route of the spinning roller rolling-off point, are utilized for subsequent spinning process as the reference path coordinates.

4. Process according to claim 1 or claim 2, further comprising, from the set of coordinate data obtained by scanning the outer contour of the spinning chuck and fed into the NC or CNC control unit adding axial ($\pm X$)-radial-component data, to produce a set of coordinate data corresponding to the course of a reference contour which must be actuated with a predetermined output rate of the reference position value data representing this contour, so that the finished spun part is provided with the predetermined outer contour.

5. Process according to claim 1, further comprising, from the set of coordinate data obtained by scanning the outer contour of the spinning chuck, adding axial coordinate increments ($\pm \delta X$) and radial coordinate increments ($\pm \delta Y$), to produce a set of coordinate data corresponding to a safety contour extending at a minimum distance from the outer contour of the spinning chuck and within the reference contour of the spun part to be produced, triggering a control signal during traversal thereof by the rolling-off point of the spinning roller, and initiating at least one of the following safety measures in response to this signal:
  1. cutting off the coordinate drive units,
  2. reducing the circuit amplification of the follow-up control circuits of the coordinate drive units,
  3. triggering a warning signal.

6. Process according to claim 5, wherein, during the scanning of the outer contour of the spinning chuck, during a first revolution of the spinning roller extending over the coordinate variation range, one of the two coordinate drive units is exposed to a constant, low drive pressure whereas the other coordinate drive unit is operated at a relatively higher circuit amplification and is activated with a defined, preferably time-constant output rate of the coordinate reference value data to be reached in one revolution of the spinning roller, and thereafter, during the course of a second revolution of the spinning roller extending over the coordinate variation range, the other of the two coordinate drive units is exposed to constant, low drive pressure whereas the one coordinate drive unit is operated with the relatively higher circuit amplification and is activated with a defined, preferably time-constant output rate of the coordinate reference value data to be reached in one revolution of the spinning roller, and, during this procedure, the follow-up paths $\Delta S(x)$ and $\Delta S(y)$, respectively, occurring in the control circuit operated with the higher circuit amplification are permanently detected and stored; and that, from the thus-determined coordinate-dependent follow-up paths $\Delta S(y)$ and $\Delta S(x)$, a location-dependent profile of the path tracking velocity $V_B(x,y)$ of the spinning roller (29) is determined which, as seen over the path motion, corresponds to an at least approximately constant value of the follow-up path $$\Delta S(x, y) = \sqrt{\Delta S(y)^2 + \Delta S(x)^2}.$$

7. Process according to claim 1, wherein, in at least one revolution performed without a workpiece and at low circuit amplification of the follow-up control circuits of the coordinate drive units, at which the routing of the rolling-off point of the spinning roller corresponds to the reference contour configuration of the surface of the spun part facing away from the spinning chuck, with the path velocity $V_B$ being kept constant, measuring the location dependency of the follow-up path $\Delta S(x,y)$ by which the actual position of the pistons of the linear cylinders of the coordinate drive units lag behind the reference position; determining, from the resultant location-dependent profile $\Delta S(x,y)$ of the follow-up path $\Delta S$, the location-dependent profile $V_B(x,y)$ of the path velocity $V_B$ corresponding to a follow-up path $\Delta S$ that is constant over the path route; and controlling, according to this velocity profile $v(x,y)$, the path tracking velocity of the spinning roller.

8. A spinning lathe for forming a spun part from a round-blank sheet-metal workpiece, said spinning lathe comprising:
  a rotationally drivable spinning chuck;
  a spinning roller for forming said workpiece by pressing said workpiece against said spinning chuck to form said spun part unilaterally hugging a shaping surface of the spinning chuck;
  a bearing block supporting said spinning roller so that said spinning roller is freely rotatable about an axis fixed at the block;
  X- and Y-coordinate drive units for shifting said bearing block and the spinning roller supported thereon in two mutually orthogonal (X- and Y-) direction; said X- and Y- coordinate drive units being fashioned as valve-controlled hydraulic cylinders;
  an electronic NC or CNC control unit means for activating the coordinate drive units according to a track repetition (playback) process, in accordance with which, in at least one master spinning process, coordinate data characteristic for the thus-traversed positions of the spinning roller and determined with the aid of position pickups are stored in the electronic control unit and are processed by the latter to output data, the X- and Y- coordinate drive units being actuatable by the serial call-up of these output data along the lines of tracking the course of travel of the spinning roller determined during the master spinning process; and
  means for continuously measuring the follow-up path $\Delta S$ (lag error) corresponding to the difference between the set reference position value and the actual position value of the spinning roller at least during the last revolution of the spinning roller through which the spun part receives its final shape, said control unit means, when this measured follow-up path $\Delta S$ exceeds a threshold value $\Delta S_{max}$, taking at least one of the following measures:

1. reducing the path tracking velocity $V_B$ of the spinning roller by decreasing the control data output rate, and
2. transitioning to a path routing curve of the spinning roller and thus of its rolling-off point corresponding to an increase of the distance of the spinning roller rolling-off point, measured normally to the outer contour of the spinning chuck, with respect to its previously governing reference value curve, until the threshold value $\Delta S_{max}$ has been exceeded in the downward direction by a defined amount of $\delta_S$.

9. Spinning lathe according to claim 10, wherein said means for continuously measuring includes follow-up control valves provided for controlling the path motion components by means of the coordinate drive units, said follow-up control valves being fashioned as proportionate valves wherein the deflections of their valve members from a neutral basic position are a measure for the follow-up path $\Delta S$ of the respective coordinate drive control circuit.

10. Spinning lathe the according to claim 9, wherein the coordinate drive units are provided with respectively one follow-up path measuring system which produces electrical output signals characteristic for the deflections of the valve-operating members of the follow-up control valves from their basic position (0).

* * * * *